United States Patent Office 3,345,404
Patented Oct. 3, 1967

3,345,404
CARBOXYLIC ACIDS PRODUCED BY THE REDUCTION OF TRANSANNULAR PEROXIDES
Walter H. Schuller and Ray V. Lawrence, Lake City, Fla., assignors to the United States of America as represented by the Secretary of Agriculture
No Drawing. Filed Apr. 2, 1964, Ser. No. 356,986
3 Claims. (Cl. 260—514.5)

A non-exclusive, irrevocable, royalty-free license in the invention herein described, for all government purposes, throughout the world, with the power to grant sublicenses for such purposes, is hereby granted to the Government of the United States of America.

This invention relates to a process for the reduction of transannular peroxides and to the products resulting from the process. More specifically, it relates to a process for the reduction of levopimaric acid transannular peroxide (I) and to the two products resulting from the process. These products are the unsaturated glycol 6,14-dihydroxy-$\Delta^{7(8)}$-dihydroabietic acid (II) and a conjugated dienic unsaturated monohydroxy alcoholic resin acid (III).

As contemplated in our invention, the term "transannular peroxide" includes levopimaric acid transannular peroxide, per se, and also includes the products obtained from the photosensitized oxidation of pine gum which will be discussed more fully below. Since one of the major products resulting from this photosensitized oxidation of pine gum is levopimaric acid transannular peroxide (I) it will be used below to exemplify our invention.

The structure of the levopimaric acid transannular peroxide is (I). The numbering system is according to W. Klyne, J. Chem. Soc. 3072 (1953).

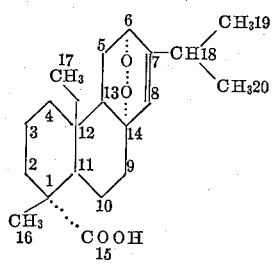

It exhibits $[\alpha]_D^{25}$ +101° (.1% in ethanol), $M_D$ +305.

The structure of the 6,14-dihydroxy-$\Delta^{7(8)}$-dihydroabietic acid is (II).

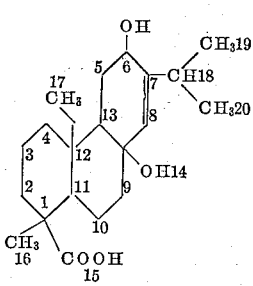

It exhibits $[\alpha]_D^{25}$ −14.4°; M.P. 217–218° C.

Work on the exact structure of the conjugated dienic unsaturated monohydroxy alcoholic resin acid (III) is continuing. However, the analytical data for (III) as will be discussed more fully below will fully characterize this product.

The unsaturated glycol (II) has a variety of commercial uses including the manufacture of polyesters, polyurethane foams, plastics, and surface coatings. The conjugated dienic unsaturated monohydroxy alcoholic resin acid (III) is useful in the preparation of linear polyesters via self-polymerization which can be used in fortified-rosin surface coatings. As will be noted more fully below, the dienic system is lost during the polymerization.

Levopimaric acid transannular peroxide (I) may be prepared according to the procedure described in U.S. Patent 2,996,515, issued Aug. 15, 1961. The dotted lines in the formula indicate an α-configuration (J. Am. Chem. Soc., 83, 2563 (1961)).

In the process of reduction according to our invention, about 30 parts by weight of the levopimaric acid transannular peroxide (I) is dissolved in about 200 parts by volume of 95% ethyl alcohol containing 0.15 part by weight of Adam's platinum oxide catalyst. The system is then evacuated, the solution is stirred, and hydrogen is admitted at ambient temperature and pressure until about 0.64 mole hydrogen per mole of the levopimaric acid transannular peroxide has been added at which point absorption of hydrogen ceases. Stirring is then stopped and the excess hydrogen is vented. The reduced products from (I) are then recovered by first filtering off the catalyst and then crystallizing the synthesized material from a warm aqueous alcohol solution (60°–70° C.) by cooling and rubbing, whereby the glycol (II) is recovered. Subsequently, separation by recrystallization from 95% ethanol produces the conjugated dienic resin acid (III).

Analytical data indicated the first portion of recovered product to be the unsaturated glycol 6,14-dihydroxy-$\Delta^{7(8)}$-dihydroabietic acid (II) in an amount of about 16% of product (II) and 10% of product (III), percent being by weight. The second portion proved to be a conjugated dienic unsaturated monohydroxy alcoholic resin acid (III) having the following properties:

M.P. 163.5–165.5° C.; $[\alpha]_D^{25}$ −152° (c. 0.77 in 95% ethanol); peroxide test negative; neutralization equivalent 320; carbon analysis, 75.2%; hydrogen analysis, 9.4%;

$$\lambda_{max}^{alc.}\ 243.5\ m\mu\ (\alpha\ 84.5)$$

U.V. shoulders at 236–237 mμ and 250–252 mμ; $\lambda_{max}$ (Nujol mull) 2.98μ.

N.M.R. (nuclear magnetic resonance) values are given as τ (tau), i.e., tetramethylsilane which is used as an internal reference; values in parenthesis indicate the number of hydrogen atoms present. τ values follow:

τ=6.83(2) one —OH and one —COOH;
τ=5.83(1) one vinyl hydrogen;
τ=5.50(1) another vinyl hydrogen;
τ=4.28(1) hydrogen on a carbon bearing an oxygen group;
τ=1.23(3) methyl group;
τ=1.11(J=7) and 1.0(J=7) centers of two doublets (3 each) (isopropyl group);
τ=0.79(3) a methyl group.

The synthesis of products (II) and (III) by our novel method of reduction of (I) was entirely unexpected. Paget (J. Chem. Soc. 829, 832 (1938)) used hydrogen in the presence of Adam's platinum oxide catalyst to reduce the transannular peroxide, ascaridole (IV)

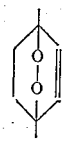

IV.

The product obtained by Paget was the saturated peroxide dihydroascaridole (V). Just why the reduction of levopimaric acid transannular peroxide (I) produces two unsaturated compounds (II) and (III) while the reduction of a similar transannular peroxide, ascaridole (IV) produces a saturated peroxide (V) is not understood.

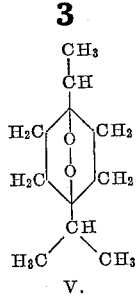

V.

The reduction can also be carried out in other suitable solvents such as aliphatic alcohols, aliphatic acids, and aliphatic acid esters, with 95% ethyl alcohol as the solvent of choice. The number of C-atoms in the alcohols and acids should not exceed eight. The total number of C-atoms in the ester (acid plus alcohol) should not exceed ten. Ratios of levopimaric acid transannular peroxide to solvent may range from about one part of the peroxide per liter of 95% ethyl alcohol and 0.01 part of platinum oxide, to about 200 parts of the peroxide per liter of 95% ethyl alcohol in the presence of 1.0 part of platinum oxide (above parts are by weight).

Other ratios of catalysts to peroxide may be used; ranges of about 0.25 to 25 weight percent catalyst on the weight of the peroxide cause good result to be obtained. The preferred range is from about 0.5–0.75% by weight of the transannular peroxide.

Other metal catalysts well known in the art may be used as, for example, palladium-on-carbon. Temperatures may range from about 15°–45° C., preferably around 20°–30° C.

It is also within the scope of our invention to substitute photosensitized, oxidized pine gum for the levopimaric acid transannular peroxide (I) in the process of this invention. Products of this photosensitized, oxidized pine gum (prepared according to U.S. Patent 2,996,515 discussed above) in addition to the transannular peroxide (I) are:

(a) Palustric acid transannular peroxide [J. Am. Chem. Soc. 83, 2563 (1961)]; and
(b) Neoabietic acid diperoxide (18-hydroperoxy-6,14-peroxy-$\Delta7(8)$-dihydroabietic acid).

These reduced, photosensitized oxidized products are generally useful in a wide variety of industrial applications including the manufacuture of styrenated unsaturated polyester resins, surface active agents, plastics, surface coatings, etc. The amount of hydrogen absorbed by the levopimaric acid transannular peroxide can also be varied from about 0.5 mole to 1.5 moles hydrogen per mole of peroxide. The most desirable range is between about 0.5 to 1.0 mole hydrogen per mole of peroxide.

As noted above, the reduction with the photosensitized oxidized pine gum is usually run at ambient temperatures (within the range of 15°–45° C.) and preferably about 20°–30° C.

The folowing examples are set forth by way of illustration only and it will be understood that the invention is not to be construed as limited in spirit or in scope by the details therein. Temperatures are degrees centigrade. Melting point (M.P.) is determined by means of a Thomas Hoover Melting Point Apparatus; $[\alpha]_D^{25}$ is determined by means of standard equipment; infrared $\lambda_{max}$ (Nujol mull) is determined by means of a Perkin-Elmer Model 21 infrared spectrophotometer; N.M.R. is determined by means of a Varian A–60 spectrophotometer.

*Example 1*

A solution of 30.1 parts of levopimaric acid transannular peroxide (I) in 200 ml. of 95% ethyl alcohol containing 0.15 part of platinum oxide catalyst dispersed in same is hydrogenated in a glass vessel containing a magnetic stirrer and equipper in such a way that a vacuum is able to be applied to the system at will, or hydrogen can be fed into the closed system from a calibrated reservoir. The system is placed in a constant temperature bath. The flask is evacuated several times and filled with hydrogen to remove the air present. Hydrogen is supplied at atmospheric pressure and stirring is then initiated. Hydrogen absorption is discontinued at 0.64 mole of hydrogen per mole of peroxide. The catalyst is removed by filtration and water is added to the filtrate to turbidity at 60° C. Warming to 70° C. gives a clear solution. On cooling and rubbing, crystals are obtained; weight 19 g. (63%). The mixture is crystallized from 1 l. of 95% ethyl alcohol to give 3.3 g. of the pure glycol, 6,14-dihydroxy-$\Delta^{7(8)}$ dihydroabietic acid (II), M.P. of 217–218°. The product decomposes with evolution of gas, is insoluble in water, acetonitrile, glacial acetic acid, chloroform, acetone, and n-pentyl ether, and is very soluble in pyridine; $[\alpha]_D^{25}$ −14.4° (c. 0.18 in absolute alcohol); $\lambda_{max}$ (Nujol mull) 2.96μ and 3.04μ (associated —OH), 6.87μ and 7.98μ (—OH bands), 9.97μ (C—O stretch), 15.0μ; test for peroxide is negative; there is no characteristic absorption in absolute ethanol from 220–320 mμ indicating the absence of conjugated dienes; N.M.R. (tetramethylsilane as internal standard) $\tau$=5.62 (vinyl hydrogen at C–8), 4.22 (hydrogen on C–6 carbon, to which the hydroxyl is also attached).

*Analysis.*—Calcd. for $C_{20}H_{32}O_4$: C, 71.4%; H, 9.6%; secondary hydroxyl (via acetic anhydride-pyridine method under forcing conditions) 5.1%; neutralization equivalent 337. Found: C, 71.3%; H, 9.5%; secondary hydroxyl 5.5%; neutralization equivalent 338.

The second crop from the recrystallization, weight 9.2 g., is recrystallized repeatedly from 95% ethyl alcohol, the first crops being the above described glycol (II) (total yield of additional glycol 1.5 g. or a total of 4.8 of glycol). On recrystallization to constant physical properties, the conjugated dienic monohydric alcoholic resin acid (III) is obtained in the amount of 2.9 g.; M.P. 163.5–165.5° C.; $[\alpha]_D^{25}$ −152° (c. 0.77 in 95% ethyl alcohol); peroxide test negative, $$\lambda_{max}^{alc.} \ 243.5 \ m\mu \ (\alpha \ 84.5)$$

shoulders at 236–237 mμ, and 250–252 mμ, $\lambda_{max}$ (Nujol mull) 2.98(3) (hydroxyl stretching band); N.M.R. (tetramethyl silane as internal reference, values in $\tau$; values in parentheses are number of hydrogens); $\tau$=6.83(2) (one —OH and one —COOH); 5.83(1) (one vinyl hydrogen); 5.50(1) (another vinyl hydrogen); 4.28(1) hydrogen on a carbon bearing an oxygen group); 1.23(3) methyl group; 1.11 (J=7) and 1.0 (J=7) (centers of two doublets, (3 each) (isopropyl group); 0.79(3) (a methyl group); carbon analysis, 75.2%; hydrogen analysis, 9.4; neutralization equivalent 320.

*Example 2*

A reduction is carried out under essentially similar conditions as described in Example 1 except that 80 parts by weight of levopimaric transannular peroxide (I) are dissolved in 800 parts of 95% ethyl alcohol, in which is dispersed 0.40 part of platinum oxide. Hydrogen uptake is discontinued at 0.61 mole of hydrogen per mole of peroxide. Crystallization of the crude gives a 40% yield which, after separation by fractional recrystallization, gives 7.2 parts of pure 6,14-dihydroxy-$\Delta^{7(8)}$-dihydroabietic acid (II), and 11.2 parts of the same pure conjugated dienic monohydric alcoholic resin acid (III), of M.P. 163.5–165.5° C.; $[\alpha]_D^{25}$ −152° (c. 0.77 in 95% ethyl alcohol) and other properties essentially identical to those described in Example 1.

*Example 3*

A reduction is carried out under essentially similar conditions as described in Example 1 except that 53 parts of the levopimaric acid transannular peroxide is dissolved in 7900 parts of 95% ethyl alcohol containing 0.26 part of platinum oxide and the hydrogen uptake is discontinued at 1.0 mole hydrogen per mole of transannular peroxide. The total yield of material crystallized from the run is 41.4 parts which after fractional recrystallization is separated into 9.1 parts of pure 6,14-dihydroxy-$\Delta^{7(8)}$-dihydroabietic acid (II) and 13.6 parts of the same conjugated dienic monohydric alcoholic resin acid (III) described in Example 1 having an M.P. 163.5°; 165.5° C.;

$[\alpha]_D^{25}$ —152°

(c. 0.77 in 95% ethyl alcohol) and other properties as described in Example 1.

Example 4

A solution of 32.7 parts by weight of photosensitized oxidized pine gum (prepared as described in U.S. Patent 2,996,515) in 2 liters of 95% ethyl alcohol, containing 3.3 parts of platinum oxide catalyst is treated in essentially the same manner as described in Example 1 and a reduction with hydrogen is carried out. A total of 5160 ml. of hydrogen at standard temperature and pressure (S.T.P.) has been absorbed when the reaction is discontinued. A titration of the reaction mixture for peroxide indicates essentially no unreduced peroxide remaining at this point. The solution is processed as in Example 1 and the product is obtained as a friable solid which is soluble in ethyl and methyl alcohols, acetone, acetonitrile, and benzene. It is insoluble in water, pentane, and isooctane. It exhibits a negative test for peroxide and has a neutralization equivalent of 342. It is soluble in aqueous alkali and the solution then develops an absorption maximum at 234 m$\mu$. Before treatment with base the product exhibits a strong characteristic band at 244 m$\mu$ (but none at 234 m$\mu$) weak bands at 268 m$\mu$ and 276 m$\mu$ ascribable to dehydroabietic acid, and a strong band at 2.95$\mu$ (hydroxyl stretching band) (Nujol mull).

Example 5

A reduction is carried out in the manner essentially that described in Example 1, except that 25 parts of photosensitized oxidized pine gum (as prepared in U.S. Patent 2,996,515) is dissolved in 1 liter of methyl alcohol in which is dispersed 0.50 part of palladium-on-carbon catalyst. Hydrogen absorption is terminated at 3000 ml. of hydrogen uptake. The solution is worked up as described in Example 1 and the friable solid has essentially the same properties as the product described in Example 4.

Example 6

A reduction is carried out essentially as described in Example 1 except that 25 parts of levopimaric acid transannular peroxide is dissolved in 1 liter of ethyl acetate in which is dispersed 0.25 part of platinum oxide. Hydrogen absorption is terminated at 0.84 equivalent of hydrogen at standard temperature and pressure (S.T.P.) per mole of peroxide. The product is crystallized from aqueous ethanol to give 19 parts of crystalline product. After fractional recrystallization, 6.2 parts of 6,14-dihydroxy-$\Delta^{7(8)}$-dihydroabietic acid (II) is otained, and 3.5 parts of the same conjugated dienic unsaturated monohydroxy alcoholic resin acid (III) described in Example 1 having an M.P. 163.5–165.5° C. and $[\alpha]_D^{25}$ —152° (c. 0.77 in 95% ethyl alcohol).

We claim:
1. The product obtained by hydrogenating a solution of a transannular peroxide-containing photosensitized oxidized pine gum in a solvent selected from the group consisting of aliphatic alcohols having up to 8 carbon atoms, aliphatic acids having up to 8 carbon atoms, and aliphatic acid esters wherein the total number of carbon atoms does not exceed 10, the hydrogenation being carried out at ambient temperature and pressure in the presence of a catalyst selected from the group consisting of platinum oxide and palladium-on-carbon until the amount of hydrogen absorbed is about from 0.5 to 1.5 moles of hydrogen per mole of transannular peroxides.

2. The conjugated, dienic, unsaturated monohydroxy alcoholic resin acid derived from the hydrogenation of levopimaric acid transannular peroxide having the following characteristics: a melting point of 163.5 to 165.5° C., $[\alpha]_D^{25}$ —152° (c. 77 in 95% ethanol); a negative peroxide test a neutralization equivalent of 320; a carbon analysis=75.2% and hydrogen analsyis=9.4% (by weight), $\lambda$ (Nujol mull) 2.98$\mu$; and the nuclear magnetic resonance values ($\tau$) of which are (N.M.R.):

$\tau$=6.83(2)
$\tau$=5.83(1)
$\tau$=5.50(1)
$\tau$=4.28(1)
$\tau$=1.23(3)
$\tau$=1.11(J=7)
$\tau$=1.0(J=7)
$\tau$=0.79(3)

3. The unsaturated glycol 6,14-dihydroxy-$\Delta^{7(8)}$-dihydroabietic acid.

References Cited

Paget: "J. Chem. Soc. (London)," (1938), pp. 829–833.

LORRAINE A. WEINBERGER, *Primary Examiner.*

RICHARD K. JACKSON, *Examiner.*

V. GARNER, *Assistant Examiner.*